Figure 1:
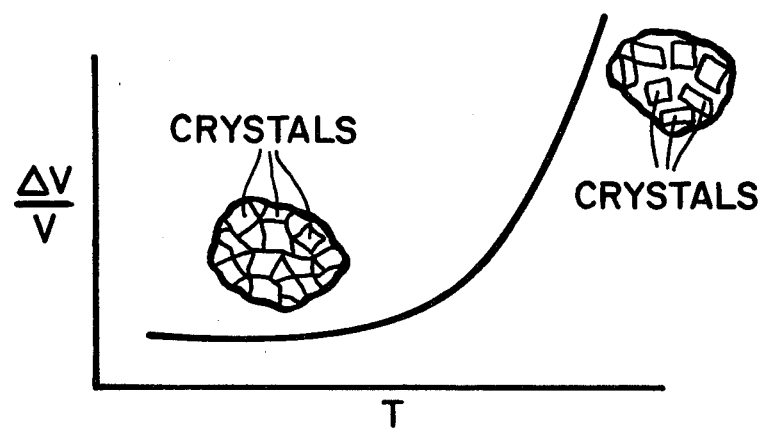

United States Patent [19]

Beall et al.

[11] 4,391,914
[45] Jul. 5, 1983

[54] STRENGTHENED GLASS-CERAMIC ARTICLE AND METHOD

[75] Inventors: George H. Beall, Big Flats, N.Y.;

[73] Assignee: Corning Glass Works, Corning, N.Y.

[21] Appl. No.: 387,790

[22] Filed: Jun. 14, 1982

[51] Int. Cl.³ .................. C03C 3/22; C03C 3/04
[52] U.S. Cl. .................................. 501/4; 501/7; 501/61; 501/66; 501/67
[58] Field of Search .............. 501/4, 7, 61, 66, 67

[56] References Cited

U.S. PATENT DOCUMENTS

| | | | |
|---|---|---|---|
| 2,920,971 | 1/1960 | Stookey | 501/7 |
| 3,148,994 | 9/1964 | Voss | 501/5 |
| 3,473,937 | 10/1969 | Tashiro et al. | 501/6 |
| 3,498,775 | 3/1970 | Simmons | 501/6 |
| 3,524,748 | 8/1970 | Beall | 501/4 |
| 3,907,577 | 9/1975 | Kiefer et al. | 501/7 |
| 3,931,438 | 1/1976 | Beall et al. | 65/33 |
| 3,985,533 | 10/1976 | Grossman | 501/7 |
| 4,074,992 | 2/1978 | Voss | 501/7 |
| 4,192,688 | 3/1980 | Babcock et al. | 501/7 |
| 4,239,521 | 12/1980 | Beall | 65/33 |

*Primary Examiner*—Mark Bell
*Attorney, Agent, or Firm*—Clinton S. Janes, Jr.

[57] ABSTRACT

The glass-ceramic disclosed is characterized by a lithium aluminosilicate crystal phase having a very low coefficient of thermal expansion and a residual glassy phase of substantial amount and higher coefficient of expansion, usually a borosilicate or boroaluminosilicate glass. The two phases form a dilatant system wherein the thermal expansion curve changes markedly in character at a transition point in the range of 500°–750° C., the crystal phase dominating below that temperature and the glass phase controlling at higher temperatures.

3 Claims, 2 Drawing Figures

STRENGTHENED GLASS-CERAMIC ARTICLE AND METHOD

BACKGROUND OF THE INVENTION

The present invention concerns glass-ceramic materials having unique physical characteristics whereby their mechanical strength is enhanced by a chilling action. It is particularly concerned with certain glass-ceramic materials having these characteristics and further being characterized by very low thermal coefficients of expansion. The latter are due to a lithium aluminosilicate crystal phase, such as a beta-spodumene solid solution or a stuffed beta-quartz solid solution crystal phase, developed in the material.

A glass-ceramic material is the polycrystalline product of uniform, internal, in situ crystallization of a glass by heat treatment. Depending on the size of the crystals developed, the material may be transparent or opaque. Crystal size is influenced, among other things, by the nature of the nucleating agent, the crystal phase formed, and the degree and extent of heat treatment.

The crystal phase in a glass-ceramic usually predominates over any residual glass phase. For example, in most commercial material, the crystal phase constitutes over 90% of the body. A residual glass phase occurs when certain glass constituents either exceed the stoichiometry of the crystal phase or do not enter such phase. The residual glass phase is usually very different in composition from the original glass. Also, the influence it has on glass-ceramic properties is normally considered to be relatively minor.

Numerous publications, describing specific materials and methods of producing and treating such materials, have followed the introduction of glass-ceramic materials in U.S. Pat. No. 2,920,971 (Stookey) granted Jan. 8, 1960. That patent teaches that the first step in glass-ceramic production is melting and forming of a corresponding glass, usually including a crystallization catalyst or nucleating agent. The glass article formed from the melt is then reheated to initially form nuclei. These, in turn, act as sites for crystal growth as the heat treatment continues and the temperature is raised. Since innumerable nuclei form throughout the glass, the crystals that grow on these nuclei tend to be fine-grained and uniformly dispersed.

Glass-ceramic materials tend to have greater inherent mechanical strength than do the parent glasses from which they are produced. A case in point is the low expansion lithium aluminosilicate glass-ceramics employed in commercial cookware. Thus, flexural strengths, measured on abraded canes of the parent glass, tend to be in the range of 4,000 to 5,000 pounds per square inch (psi). By comparison, similar values, measured on transparent glass-ceramic cane (same chemical composition and abrasive treatment), are on the order of 8,000 psi, and on opaque glass-ceramic cane are on the order of 12,000 psi.

Such increased mechanical strength, taken with the very low thermal coefficient of expansion, has been a major asset of glass-ceramic materials, and, for many purposes, has set them apart from glasses. Nevertheless, there has been a continuous quest for means to further increase the mechanical strength of these materials beyond their inherent values. This has resulted in development of several techniques for strengthening these glass-ceramic materials of inherent low thermal expansion.

One such technique is disclosed in detail in U.S. Pat. No. 3,148,994 (Voss). It involves adding a small amount of fluoride to certain glass compositions to produce substantially increased inherent mechanical strength. However, the effectiveness of this expedient is limited to certain compositions. Also, the resulting surface is not sufficiently smooth for some purposes.

Chemical strengthening of glass-ceramics by ion exchange has been widely studied. A typical method is described in U.S. Pat. No. 4,074,992 (Voss). In accordance with that patent teaching, sodium ions are introduced into beta-spodumene crystals, in a surface layer on a glass-ceramic material, in place of lithium ions. The cost of this extra step is generally considered prohibitive.

Treatment in a sulfur dioxide atmosphere, either before or during the ceramming cycle, has also been proposed. This too involves an extra operation, as well as problems in controlling and exhausting the gas.

Another technique involves forming a laminated article wherein a compressively stressed surface layer encompasses a body or interior portion. The laminae may be similar chemically, but differ in thermal coefficients of expansions, or may densify to different degrees as they cool.

For example, U.S. Pat. No. 3,473,937 discloses applying a low expansion, lead borosilicate glaze to a higher expansion, aluminosilicate glass-ceramic to create a compressively stressed body.

U.S. Pat. No. 3,524,748 (Beall) discloses a strengthened glass-ceramic article in which the interior of the article is characterized by an alpha-quartz crystal phase and the dominant crystal phase in the compressively stressed surface layer is beta-quartz. The article is made by developing a siliceous beta-quartz solid solution throughout and then quenching to prevent a surface layer from changing while the slower cooling interior undergoes inversion to alpha-quartz.

The same principle of a compressively stressed surface is implemented in a rather different manner in U.S. Pat. No. 3,931,438 (Beall et al.). In accordance with this patent, a laminated article is formed with one lamina being a surface layer encompassing the interior. The two portions are similar chemically, and close in thermal expansion, but densify to very different degrees on cooling. This establishes the desired compressive stresses in the surface lamina.

PURPOSE OF THE INVENTION

Each of these methods is an effective means of accomplishing the basic purpose of increasing strength. Nevertheless, there has been a reluctance to adopt them because of the extra steps and/or adverse side effects involved. There has then been a continued need for, and an effort to attain, a simple method of increasing the mechanical strength of glass-ceramics, especially those having low coefficients of thermal expansion where differential expansion of surface and interior is unavailable.

It is then a basic purpose of the present invention to meet this need and supply such simple strengthening method. A particular purpose is to provide a method of strengthening glass-ceramic articles that does not include laminating or otherwise forming layers of different composition. Another specific purpose is to provide a means of producing low expansion glass-ceramic articles having increased mechanical strengths. A further specific purpose is to provide a means of strengthening glass-ceramic articles wherein the strength may be imparted during, or as part of, the ceramming cycle.

PRIOR LITERATURE

In addition to the U.S. Patents already mentioned, certain others may also be of interest.

U.S. Pat. No. 3,498,775 and No. 3,637,453 (Simmons) contain essentially identical disclosures. They disclose a unique method of developing an integral compressive stress surface layer on a glass-ceramic whereby, on breakage, the article dices rather than forming shards. The technique involves (1) selecting an $R_2O$-$Al_2O_3$-$SiO_2$ glass-ceramic of thermal coefficient of expansion between 35 and $140 \times 10^{-7}/°C.$, (2) exchanging lithium ions into the surface of the glass-ceramic, (3) further heating the lithium-rich surface layer to enhance crystal development, and then (4) thermally tempering the body to develop the unique stress condition which causes dicing.

U.S. Pat. No. 4,239,521 (Beall) discloses a family of glass-ceramics which can be formed spontaneously by cooling a molten glass batch without reheating. These glass-ceramics have compositions in a narrow portion of the $Li_2O$-$Al_2O_3$-$B_2O_3$-$SiO_2$-$TiO_2$ field wherein alpha-quartz solid solution is the predominant crystal phase. The patent discloses a substantial increase in strength by quick quenching (thermal tempering). The effect is ascribed to the small amount of residual glass appearing as a continuous phase.

U.S. Pat. No. 3,985,533 (Grossman) discloses another family of spontaneously-formed glass-ceramics, this family being in the $Li_2O$-$Al_2O_3$-$SiO_2$-F composition field. In these glass-ceramics, beta-spodumene solid solution constitutes the predominant phase, the molar ratio of $Al_2O_3$:$Li_2O$ must be below unity, and the thermal coefficient of expansion is in the range of $15$-$45 \times 10^{-7}/°C.$ ($25°$-$500°$ C.). As in the preceding Beall patent, the possibility of increasing strength by quick quenching (thermal tempering) is disclosed.

A similar disclosure is found in abandoned application Ser. No. 559,788 filed Mar. 19, 1975 in the names of G. H. Beall, P. E. Blaszyk, and W. T. Brydges, III. In that application, there is disclosed a narrow composition region in the $Li_2O$-$Al_2O_3$-$SiO_2$-$TiO_2$ field wherein glass-ceramics contain beta-spodumene solid solution as a dominant phase and also require an $Al_2O_3$:$Li_2O$ molar ratio below unity.

In general, these disclosures do not contain any teaching relative to dilatancy, the application of its principles to glass-ceramic strengthening, or compositions to which it applies.

SUMMARY OF THE INVENTION

The invention is based on my discovery that certain glass compositions form a two-phase dilatant system upon ceramming which, upon quenching, can produce low expansion glass-ceramics exhibiting strengths as much as double those of current commercial compositions. The two-phase system consists of a dominant crystalline network and a residual glassy matrix. The crystalline network is a lithium aluminosilicate having a very low coefficient of thermal expansion. The residual glass phase constitutes about 15 to 30% by volume of the material, and has an expansion coefficient that is substantially higher than the crystalline phase. The two phases form a dilatant system wherein the thermal expansion curve of the system has two distinct sections diverging from a transition temperature in the range of 500° to 750° C.; the upper section of the curve being steep and being controlled by the residual glass phase, and the lower section being essentially flat and corresponding to the curve of the crystal phase. The bulk composition of the body is essentially, in percent by weight calculated on an oxide basis, 60-80% $SiO_2$, 14-25% $Al_2O_3$, 2.5-7% $Li_2O$, 2-5% $B_2O_3$, 0-2% MgO and/or ZnO, 3-6% $TiO_2$ and/or $ZrO_2$, and 0.5-5 mole percent of glass-modifying oxides selected from $Na_2O$, $K_2O$ and divalent oxides, the molar ratio of $Al_2O_3$:$Li_2O$ being greater than unity.

In one embodiment, the glass is so formulated as to crystallize fine-grained lithium aluminosilicate crystals that are stuffed derivatives of beta-quartz and/or beta-spodumene solid solutions. The residual glass phase is preferably a borosilicate or boroaluminosilicate glass that remains vitreous with further heat treatment, and has a substantially higher coefficient of thermal expansion. The amount of glass is sufficient to form a continuous phase that separates the crystals at an elevated temperature, but shrinks on cooling so that the crystal network reforms and the glass occupies interstitial positions within the network on cooling.

THE DRAWING

Figure 2:
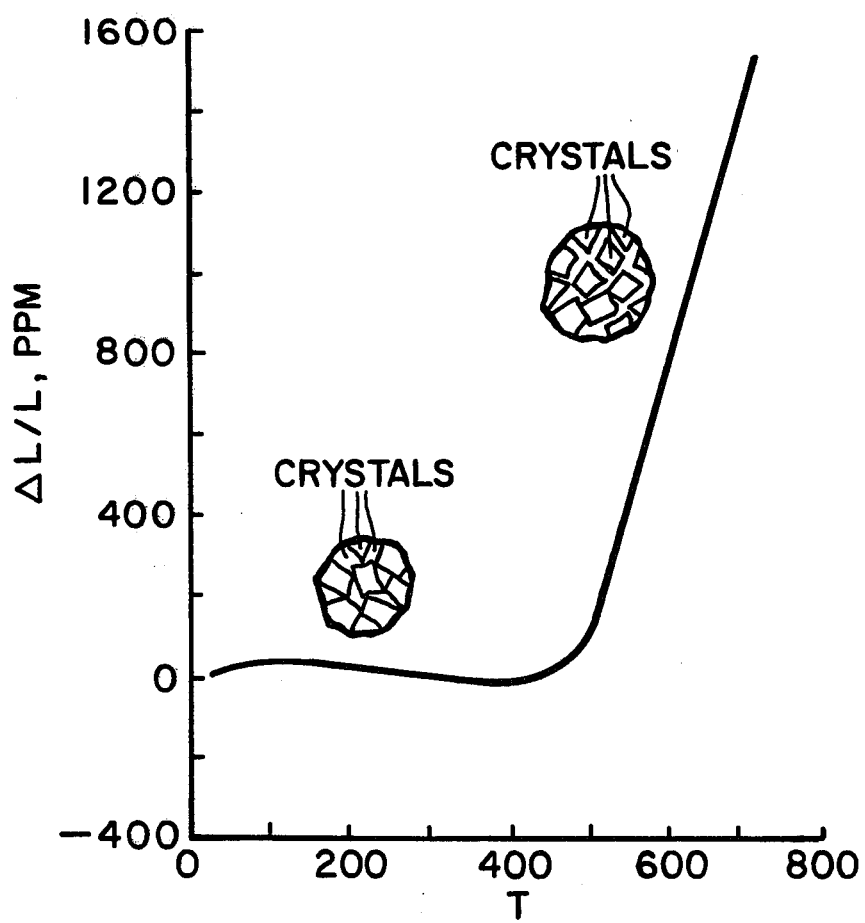

In the drawing:

FIG. 1 is a graphical illustration of a typical thermal expansion curve for a material in accordance with the invention, and FIG. 2 is a similar illustration for a specific embodiment of the invention.

GENERAL DESCRIPTION

The glass-ceramic body of the invention is a two-phase, dilatant system. It essentially differs from prior glass-ceramic concepts in that the composition is carefully tailored to provide a substantial residual glass phase. This glass phase will constitute 15 to 30% by volume of the body, preferably about 20 to 25%.

The residual glass has a substantially higher coefficient of thermal expansion than does the crystal phase. As a consequence, it expands faster as the body is heated. Conversely, the glass tends to contract faster when the material is cooled. The amount of glass is such as to form a continuous matrix at crystallization (ceramming) temperatures. Hence, the crystals, while dominant in amount, nevertheless are separated in the glass matrix. As the material cools, the higher expansion glass contracts faster and reaches a point where the crystals touch to form a crystalline network with the continuous glass matrix being destroyed and the glass occupying interstitial positions. Further cooling to room temperature produces a negative pore pressure, or tension, in the glass, while a positive grain pressure, or compressive locking, occurs in the crystals.

The phenomenon is somewhat analogous to the dilatancy hardening that occurs when a sand-water mixture is confined in a balloon and sheared to increase the volume and decrease the fluid pore pressure with a loss of close packing. It is also similar to the dramatic hardening which occurs when air is pumped out of a loose sand-air mixture confined in a balloon.

Prior experience showed that fracture patterns in glasses containing scattered ceramic spheres could be shifted between transgranular and intergranular by proper choice of the coefficient of thermal expansion for the glass. Thus, low expansion spheres in a higher expansion soda lime glass favored transgranular patterns with fractures running into the ceramic spheres. Conversely, dispersing the beads in a low expansion borosilicate glass produced a weaker composite with an intergranular fracture pattern.

It is believed a similar fracture pattern tends to develop in the present glass-ceramics. Thus, the higher expansion residual glass tends to contract on the crystals on cooling setting up point compressive stress in the crystalline network. As a consequence, fracture impediment, due to a transgranular pattern, develops with resultant fracture toughness.

Even more important to the development of increased strength in such a glass-ceramic is the form of the thermal expansion curve and its ramifications with regard to physical tempering. Since the residual glassy phase after ceramming is higher in thermal expansion than the crystals, it dominates the composite cooling contraction at high temperatures, providing it is geometrically continuous in three dimensions. The composition is tailored so that the glassy phase is barely continuous, whereby its shrinkage causes geometric isolation at some point in the cooling cycle. On further cooling, then, the crystalline network dominates the contraction curve. A typical transition thermal expansion curve is illustrated in FIG. 1 of the drawing along with a two-dimensional schematic representation of the microstructural change.

This thermal expansion characteristic provides a strengthening mechanism via physical tempering. When the surface of the glass-ceramic composite is quenched from the ceram temperature, it shrinks and quickly reaches the rigid state of a continuous crystalline network. From this point, it will not shrink further, providing the crystalline thermal expansion coefficient is close to zero. The interior, however, is cooling much more slowly and must contract through the glass-dominated thermal expansion regime while the surface is rigid and not contracting. Stress in the form of surface compression is thus induced, its potential magnitude depending upon the volume shrinkage of the upper part of the expansion curve.

Dilation strengthening, thus, is composed of two mechanisms: (1) increased strength from fracture toughness related to point impact stresses producing transgranular fracture, and (2) tempered strength developed by quenching the skin through the glass-dominated expansion regime, thereby producing a rigid non-contracting skin before the interior can shrink. Since the glassy phase is normally somewhat plastic in the high temperature regime, it withstands the severe shock of surface quenching. When the skin becomes entirely rigid, it has a sufficiently low thermal expansion (crystal-dominated) to avoid further cracking on rapid cooling to room temperature.

FIG. 1 of the drawing shows a typical thermal expansion curve for a material in accordance with the invention. The graphical representation intentionally omits numerical values in order to generalize. The vertical axis typically represents expansion values $\Delta V/V$, whereas the horizontal axis represents temperature, typically from zero to about 900° C.

The thermal expansion curve characteristically has two distinct segments or legs which meet at about the glass annealing point, typically in the range of 500° to 750° C. The upper (higher temperature) portion of the curve represents that temperature range over which the glassy matrix is continuous, and within which the glass dominates expansion change. The lower (lower temperature) portion of the curve represents the temperature range over which the crystal structure controls the expansion properties. With a near-zero expansion crystal phase, this lower portion will be essentially flat with little change on cooling from say 500° C. to room temperature.

As schematically shown, a continuous glass phase with separated crystals prevails over the upper arm of the curve. At the break in the curve, the glass phase is changing to a non-continuous phase. From that point down in temperature, the crystals adjoin each other in a network and the glass is dispersed in interstitial pockets.

In carrying out the invention, a lithium aluminosilicate glass containing minor but necessary amounts of other oxides is melted. This glass is melted and worked in accordance with standard commercial conditions of temperature and viscosity. The article formed is cooled to a temperature below the transformation temperature, and to ambient temperature if desired.

The glass body is then reheated to a nucleating temperature on the order of 750° C., and held for a time not exceeding about one hour. Thereafter, the temperature is raised to a crystalline temperature that will depend on whether a transparent or opaque product is desired. For transparent material, the crystallization temperature may be on the order of 850° C. and should normally not exceed 900° C. Opaque materials are characterized by larger crystal size and are produced with ceramming temperatures ranging from 1000° C.–1100° C.

Following the ceramming treatment, the now partially crystalline glass-ceramic may be quenched by air, oil or water chilling from a temperature on the order of 800° C. The latter is the process well known in the glass industry as tempering. It is continued at least until the surface sets up, usually around 500° C. The interior is then cooled in usual manner but the surface must not reheat from the interior.

It is customary in comparative strength testing to employ a standard size cane (5" long by ¼ diameter) that has been abraded by rolling in a ball mill with 30 grit silicon carbide. As noted earlier, commercial glass-ceramics so abraded show flexural strengths on the order of 8,000 psi for transparent glass-ceramics and about 12,000 psi for opaque materials. By comparison, transparent materials in accordance with the present invention show 12,000 to 20,000 psi. Opaque materials show 15,000 to 30,000 psi.

The base glass compositions employed for the previously described embodiment are composed in percent by weight on an oxide basis as calculated from the glass batch of: 60–80% $SiO_2$, 14–25% $Al_2O_3$ and 2.5–7.0% $Li_2O$. In addition, the compositions will include 2–5% $B_2O_3$, 0–2% MgO or ZnO as a replacement for $Li_2O$, and ½–5 mole % of one or more of the glass-modifying oxides $K_2O$, $Na_2O$, CaO, SrO, BaO and PbO. The range of glass-modifying oxides (½–5 mole %) is expressed in mole percent to take into account the widely varying molecular weights of these oxides. In weight percent, it approximates 1–10% depending on the oxides chosen. These oxides are essential to provide the desired residual glass. Further, the glass will include a nucleating agent, typically 3–6% by weight $TiO_2$ and/or $ZrO_2$.

The crystalline phase formed is a stuffed derivative of beta-quartz and/or keatite. Typically, it will be a lithium stuffed beta-quartz or beta-spodumene solid solution of molar stoichiometry 1:1:4 to 1:1:8 $Li_2O$:$Al_2O_3$:-

$SiO_2$. Some MgO or ZnO, if present, may replace $Li_2O$ in the crystal structure. However, the glass-forming modifying oxides $Na_2O$, $K_2O$, CaO, SrO, BaO and PbO are controlled as to amount so they will not enter the crystalline structure, even at elevated temperatures as high as 1100° C.

The residual glass phase is a minor, albeit vital, phase, constituting about 15–30% by volume of the final glass-ceramic material. It will normally be a borosilicate or boroaluminosilicate containing the glass-forming modifying oxides mentioned earlier. Its basic characteristic is its high expansion coefficient relative to the crystalline phase. Typically, with a crystal phase of near zero coefficient, the residual glass may be on the order of $30$–$60 \times 10^{-7}/°C$.

SPECIFIC DESCRIPTION

The invention is further illustrated by reference to numerous specific embodiments.

TABLE I, below, sets forth the compositions of several typical glass-ceramics which have been strengthened in accordance with the invention. These are lithium aluminosilicates containing a combination of $TiO_2$ and $ZrO_2$ as nucleating agent. The compositions are calculated on the oxide basis from the original glass batch in parts by weight, but equal or approximate percent by weight as well.

TABLE I

| | | | | | | | | | |
|---|---|---|---|---|---|---|---|---|---|
| $SiO_2$ | 76 | 70 | 73 | 75.5 | 75 | 75.5 | 69.5 | 68.5 | 68 |
| $B_2O_3$ | 5 | 5 | 4 | 2.5 | 3 | 3 | 2.5 | 2.5 | 2.5 |
| $Al_2O_3$ | 14 | 19 | 18 | 16 | 16 | 16 | 21 | 21 | 21 |
| $Li_2O$ | 4 | 5 | 4 | 4.5 | 4.5 | 4.5 | 4.5 | 4.5 | 4.5 |
| $Na_2O$ | — | — | — | — | — | 1 | — | — | — |
| $K_2O$ | 1 | 1 | — | 1.5 | 1.5 | — | 1.25 | 2 | 1.75 |
| CaO | — | — | 1 | — | — | — | — | — | — |
| BaO | — | — | — | — | — | — | 2 | 1.5 | 2.5 |
| $TiO_2$ | 2.75 | 2.5 | 2.5 | 2.5 | 2.5 | 2.5 | 2.5 | 2.5 | 2.6 |
| $ZrO_2$ | 1.5 | 1.5 | 1.5 | 1.5 | 1.5 | 1.5 | 1.5 | 1.5 | 1.5 |
| $As_2O_5$ | 1 | 1 | 1 | 1 | 1 | 1 | 1 | 1 | 1 |

Glass batches, corresponding to the formulae of Table I, were mixed employing conventional raw materials. These included sand, alumina, anhydrous $B_2O_3$, lithium carbonate, sodium carbonate, aragonite ($CaCO_3$), barium carbonate, potassium carbonate, titania, zirconia and arsenic pentoxide.

Each batch was ballmilled to improve melting and glass homogeneity, and melted for 16 hours at 1600° C. in a platinum crucible. The melted glass was then pulled into ¼" cane and/or poured into patties, and annealed at 650° C. Typically, the glasses had a viscosity of about a thousand poises in the vicinity of 1500° C.

The glass samples thus produced were then thermally treated in the usual manner to convert the glass to a glass-ceramic. Typically, the glass was heated in the range of 700°–800° C. for nucleation and then finally crystallized at a higher temperature. The total ceram cycle was 2 to 4 hours, although shorter cycles might be feasible. Where a transparent, stuffed beta-quartz glass-ceramic was desired, the top ceramming temperature was in the range of 800° to 875° C. Where an opaque, beta-spodumene type material was desired a higher temperature near 1000° C. was employed.

TABLE II shows the ceramming cycle for each example of TABLE I. RATE indicates the rate of furnace or kiln temperature increase from ambient to nucleating temperature and then to crystallizing or ceramming temperature. The rates are given in degrees centigrade per hour (°C./HR.). The first HOLD, given in degrees centigrade and hours, represents the halt at the indicated temperature for nucleation. Thereafter, the temperature is again increased at the indicated rate to a second HOLD. The second HOLD is again given in degrees centigrade and hours, and represents the crystallizing stage. Thereafter the glass-ceramic samples were cooled normally, although they might have been quenched at this point. It will be appreciated that specific dwell periods at a stated temperature are not demanded, but the article will be maintained within the nucleation and crystallization ranges of temperatures for a sufficient length of time to develop nuclei and grow crystals on the nuclei.

TABLE II

| EX. | RATE (°C./HR.) | HOLD (°C./HRS.) | RATE | HOLD |
|---|---|---|---|---|
| 1 | 300 | 800-2 | 300 | 900-4 |
| 2 | 300 | 700-2 | 300 | 1000-4 |
| 3 | 300 | 700-2 | 300 | 1000-4 |
| 4 | 300 | 725-2 | 150 | 1050-4 |
| 5 | 300 | 700-2 | 150 | 1000-4 |
| 6 | 300 | 700-2 | 150 | 1050-4 |
| 7 | 300 | 730-2 | 150 | 805-4 |
| 8 | 300 | 725-2 | 150 | 800-4 |
| 9 | 300 | 730-2 | 150 | 870-1 |

Glass test samples were selected from each example for measurement of strength. Cane samples from Example 1 were employed as drawn and cerammed, that is without further treatment except abrasion as described below. The samples of the remaining examples were brought to temperature in a furnace operating at a temperature in the range of 750° to 875° C. The samples were then removed and immediately subjected to cold water as a quenching fluid. Thus, the samples were dropped in a water bath, although they might, alternatively, have been subjected to an oil bath or to an air blast in known manner. In transparent samples, stress birefringence was then examined with a polarimeter.

All samples were abraded in a conventional manner by ballmilling for 30 minutes with 30 mesh carbide grit. Samples were ¼" cylindrical cane, except where discs were core drilled from pressed ware. In such case, M.O.R. was measured by the ring-on-ring technique. With cane samples, the conventional bending strength test was employed wherein an abraded cane is mounted in spaced V-slots and pressure applied centrally until the cane breaks.

Table III lists the measured strength data as "ABRADED MOR (psi)" and observed crystal development as MAJOR CRYSTAL PHASE for the several compositions of Table I.

TABLE III

| EX. | ABRADED MOR (psi) | MAJOR CRYSTAL PHASE |
|---|---|---|
| 1 | 19,300 | B-Spodumene S.S. |
| 2 | 20,100 | B-Spodumene S.S. |
| 3 | 21,100 | B-Spodumene S.S. |
| 4 | 27,300 | B-Spodumene S.S. |
| 5 | 27,500 | B-Spodumene S.S. |
| 6 | 21,700 | B-Spodumene S.S. |
| 7 | 18,100 | B-Quartz S.S. |
| 8 | 20,300 | B-Quartz S.S. |
| 9 | 17,500 | B-Quartz S.S. |

FIG. 2 of the drawing shows the thermal expansion curve for a typical example of the invention, Example 1. The horizontal axis ranges from zero to 600° C. with actual measurements starting at 25° C. The vertical axis represents the rate of expansion ΔL/L in parts per million (PPM).

It will be observed that there is a sharp break in the expansion curve at about 500° C. This is the point where the residual glass phase is believed to have expanded, as the material is heated, to form a continuous network as schematically illustrated by the unshaded portion of the circle adjacent the upper, or steep, portion of the curve.

It is known that a lithium-stuffed beta-quartz solid solution near the 1:1:7 $Li_2O:Al_2O_3:SiO_2$ stoichiometry has a thermal expansion coefficient close to zero or slightly negative. It is believed such a crystal phase is formed, and that it dominates the expansion characteristics in the low slope portion of the curve, that is from 25°–500° C.

This leaves, as a residual glass phase, a siliceous potassium borosilicate glass containing about 70 to 75% silica. The thermal expansion coefficient of such glass is near $50 \times 10^{-7}/°C.$, a value in agreement with that measured on the upper part of the curve, that is the steep portion from about 500° C. to 600° C. where the continuous glassy network forms and takes over control of the expansion characteristics.

I claim:

1. A glass-ceramic body composed essentially of two phases, a crystal phase and a residual glass matrix, the crystal phase being a lithium aluminosilicate selected from the group of beta-spodumene solid solution and a stuffed beta-quartz solid solution having a very low coefficient of thermal expansion, the residual glass matrix being a borosilicate or a boroaluminosilicate constituting about 15–30 percent by volume of the body but being geometrically isolated in some areas of said body, thereby setting up point compressive stresses in the crystalline network to develop a transgranular fracture pattern in said body, and having a coefficient of thermal expansion substantially higher than that of the crystal phase, the two phases forming a dilatant system wherein the thermal expansion curve of the system has two distinct sections diverging from a transition temperature in the range of 500°–750° C., the upper section of the curve being steep and being controlled by the residual glass phase, and the lower section being essentially flat and corresponding to the curve of the crystal phase, the body being chemically composed essentially of, in percent by weight as calculated on an oxide basis, 60–80% $SiO_2$, 14–25% $Al_2O_3$, 2.5–7% $Li_2O$, 2–5%, $B_2O_3$, 0–2% MgO and/or ZnO, 3–6% $TiO_2$ and/or $ZrO_2$ and 0.5–5 mole percent of glass-modifying oxides selected from $Na_2O$, $K_2O$ and the divalent oxides CaO, BaO, SnO and PbO, the molar ratio of $Al_2O_3:Li_2O$ being greater than unity.

2. A glass-ceramic body in accordance with claim 1 wherein the coefficient of thermal expansion of the glassy phase is at least $30 \times 10^{-7}/°C.$ units greater than that of the crystal phase.

3. A glass-ceramic body in accordance with claim 1 wherein the lithium aluminosilicate crystal phase has a molar composition ratio of $Li_2O:Al_2O_3:SiO_2 = 1:1:3-.5–8$.

* * * * *